(12) United States Patent
Chou et al.

(10) Patent No.: US 11,053,419 B2
(45) Date of Patent: Jul. 6, 2021

(54) GRINDING TOOL AND METHOD OF FABRICATING THE SAME

(71) Applicant: Kinik Company, Taipei (TW)

(72) Inventors: Jui-Lin Chou, New Taipei (TW); Chia-Feng Chiu, New Taipei (TW); Chin-Chung Chou, New Taipei (TW); Hsin-Chun Wang, Taoyuan (TW)

(73) Assignee: KINIK COMPANY, Taipei (TW)

( * ) Notice: Subject to any disclaimer, the term of this patent is extended or adjusted under 35 U.S.C. 154(b) by 497 days.

(21) Appl. No.: 15/980,302

(22) Filed: May 15, 2018

(65) Prior Publication Data

US 2018/0334602 A1 Nov. 22, 2018

(30) Foreign Application Priority Data

May 16, 2017 (TW) ................... 106116044

(51) Int. Cl.
*C09K 3/14* (2006.01)
*B24B 37/24* (2012.01)
(Continued)

(52) U.S. Cl.
CPC ............ *C09K 3/1409* (2013.01); *B23K 26/38* (2013.01); *B23K 26/402* (2013.01); *B23K 31/10* (2013.01);
(Continued)

(58) Field of Classification Search
CPC .... C09K 3/1409; B23K 26/38; B23K 26/402; B23K 31/10; B23K 2101/20; B23K 2103/50; B23K 2103/52; B24B 37/245; B24D 7/066; B24D 18/00; C04B 1/0036; C04B 1/91
See application file for complete search history.

(56) References Cited

U.S. PATENT DOCUMENTS

| 2016/0176017 A1 | 6/2016 | Chou et al. |
| 2019/0176017 A1 | 6/2019 | Chou et al. |

FOREIGN PATENT DOCUMENTS

| JP | 2009113133 A | * | 5/2009 |
| JP | 2009113133 A | | 5/2009 |

(Continued)

OTHER PUBLICATIONS

Office Action in co-pending Taiwan Patent Application No. 106116044 dated Dec. 20, 2017.

(Continued)

*Primary Examiner* — Pegah Parvini
*Assistant Examiner* — Ross J Christie
(74) *Attorney, Agent, or Firm* — Baker & McKenzie LLP

(57) ABSTRACT

A grinding tool includes a substrate, and at least an abrasive particle affixed to the substrate. The abrasive particle has a base, and four tips adjacent to one another protruding from the base, the base having a cavity of a generally cross shape extending between the four tips, the cavity including a material discharge surface disposed between two adjacent ones of the four tips, the material discharge surface being located at an end of the cavity and adjacent to a side surface of the base, an inner material angle between the material discharge surface and the side surface being between about 120 degrees and about 160 degrees. Moreover, embodiments described herein include a method of manufacturing the grinding tool.

14 Claims, 9 Drawing Sheets

(51) Int. Cl.
    *C04B 41/91*     (2006.01)
    *C04B 41/00*     (2006.01)
    *B23K 26/38*     (2014.01)
    *B24D 7/06*     (2006.01)
    *B23K 31/10*     (2006.01)
    *B24D 18/00*     (2006.01)
    *B23K 26/402*     (2014.01)
    *B23K 101/20*     (2006.01)
    *B23K 103/00*     (2006.01)

(52) U.S. Cl.
    CPC ............ *B24B 37/245* (2013.01); *B24D 7/066* (2013.01); *B24D 18/00* (2013.01); *C04B 41/0036* (2013.01); *C04B 41/91* (2013.01); *B23K 2101/20* (2018.08); *B23K 2103/50* (2018.08); *B23K 2103/52* (2018.08)

(56) References Cited

FOREIGN PATENT DOCUMENTS

| | | | | |
|---|---|---|---|---|
| JP | 2009-136926 A | 6/2009 | | |
| TW | 201622895 A | 7/2016 | | |
| WO | WO-2018010730 A2 * | 1/2018 | ............ | B33Y 80/00 |

OTHER PUBLICATIONS

An Office Action issued by the Japan Patent Office dated Mar. 19, 2019 in connection with Japanese patent application No. 2018-093694.

A Second Office Action issued by the Japan Patent Office dated Jul. 16, 2019 in connection with Japanese patent application No. 2018-093694.

\* cited by examiner

GRINDING TOOL AND METHOD OF FABRICATING THE SAME

CROSS-REFERENCE TO RELATED APPLICATION(S)

This application claims priority to Taiwan Patent Application No. 106116044 filed on May 16, 2017, which is incorporated herein by reference.

BACKGROUND

1. Field of the Invention

The present invention generally relates to grinding tools, and more particularly to grinding tools used in wafer polishing techniques.

2. Description of the Related Art

Grinding and/or polishing techniques are generally applied to create a desirable surface roughness or planarity on a rigid part, such as metal, ceramic or glass parts, or semiconductor wafers. To this purpose, the grinding and/or polishing techniques use tools having abrasive elements that can wear the hard surface.

A well known polishing technique is the chemical mechanical polishing (CMP) technique employed in semiconductor fabrication processes. CMP uses corrosive chemical slurry in conjunction with a polishing pad to remove undesired residues and planarize a wafer surface, which can be made of ceramic, silicon, glass, sapphire or metal. CMP can be typically conducted multiple times to planarize wafers.

After the polishing pad is used over a period of time, the grinding action of the polishing pad may diminish. Accordingly, an additional grinding tool (also called "conditioner") may be typically used to coarsen the surface of the polishing pad for maintaining an optimal grinding efficiency of the polishing pad.

Conventionally, a cutting rate of the grinding tool may be improved by increasing a distribution density of the abrasive elements or by sharpening the abrasive particles. The first approach of increasing the distribution density of the abrasive elements requires increasing the quantity of abrasive elements, which makes the grinding tool more expensive to manufacture. The second approach would typically involve cutting the abrasive particle with a machining tool to form a sharp tip. However, the conventional machining tool may produce residual stress in the processed abrasive particle, and may not be reliable to provide proper surface flatness and edge definition in the abrasive particle. As a result, the abrasive particle may have an unsmooth surface, which may be subjected to jamming issues or collapse of the tip that could damage the polishing pad. Moreover, the residual stress and improper edge definition may facilitate edge alteration and the occurrence of cracks after a period of use, which may create undesirably sharpened regions in the abrasive particle.

Therefore, there is a need for improvement that can reduce residual stress in the abrasive elements, provide better surface flatness and edge definition, and can address at least the foregoing issues.

SUMMARY

The present application describes a grinding tool that can address at least the foregoing issues. The grinding tool includes a substrate, and at least an abrasive particle affixed to the substrate. The abrasive particle has a base, and four tips adjacent to one another protruding from the base, the base having a cavity of a generally cross shape extending between the four tips, the cavity including a material discharge surface disposed between two adjacent ones of the four tips, the material discharge surface being located at an end of the cavity and adjacent to a side surface of the base, an inner material angle between the material discharge surface and the side surface being between about 120 degrees and about 160 degrees.

Moreover, the present application describes a method of fabricating a grinding tool. The method includes providing an abrasive particle, and cutting the abrasive particle with a laser beam so that the cut abrasive particle has four tips adjacent to one another, a cavity of a generally cross shape extending between the four tips, and a material discharge surface at an end of the cavity. The laser beam is applied along a plurality of parallel first cutting lines and a plurality of parallel second cutting lines, the second cutting lines intersecting the first cutting lines, at least the first cutting lines being grouped into a first, a second and a third region, the second region being located between the first and third regions, a number of cutting passes repeated along each of the first cutting lines in each of the first and third regions increasing as the first cutting line is nearer to the second region, and the laser beam repeating a plurality of cutting passes along each of the first cutting lines in the second region.

DETAILED DESCRIPTION OF THE EMBODIMENTS

Figure 1:
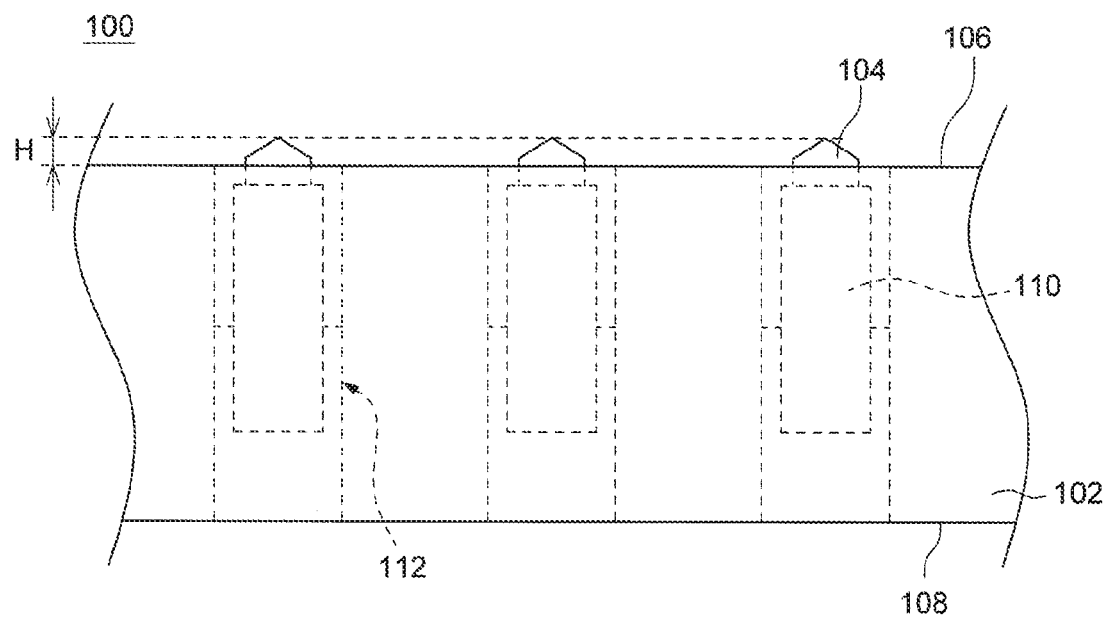
FIG. 1 is a schematic cross-sectional view illustrating an embodiment of a grinding tool.

FIG. 1 is a cross-sectional view illustrating an embodiment of a grinding tool 100. Referring to FIG. 1, the grinding tool 100 can include a substrate 102, and a plurality of abrasive particles 104 affixed to the substrate 102. Examples of materials for the substrate 102 may include, without limitation, stainless steel materials. The abrasive particles 104 can be made of any suitable materials having high hardness. Examples of suitable materials for the abrasive particles 104 may include, without limitation, diamond, cubic boron nitride, aluminum oxide, and silicon carbide.

The size of the abrasive particles 104 can exemplary be about 20 to about 30 US mesh, i.e., a mesh screen used to filter the abrasive particles 104 can have about 20 to about 30 openings per square inch. The substrate 102 can have a working surface 106 and a non-working surface 108 at two opposite sides, and the abrasive particles 104 can be distributed and protrude on the working surface 106.

According to an example of construction, a plurality of posts 110 can be used to affix the abrasive particles 104 to the substrate 102. For example, the abrasive particles 104 can be respectively connected fixedly with the posts 110 at the tops thereof, the substrate 102 can include a plurality of holes 112, and the posts 110 can be respectively attached in the holes 112 of the substrate 11 via bonding layers. Exemplary techniques for attaching the abrasive particles 104 to the posts 110 can include brazing, sintering, electroplating and the like. The posts 110 may have any suitable shapes, e.g., cylindrical shapes or parallelepiped shapes. Examples of suitable materials for the posts 110 can include metallic materials. Once the posts 110 are fixedly attached to the substrate 102, the abrasive particles 104 can protrude from the working surface 106 of the substrate 102 at a substantially equal height H (e.g., about 100 μm). Accordingly, the grinding tool 100 can be used to uniformly grind an article of interest, e.g., as a conditioner for a polishing pad article used in chemical mechanical polishing (CMP) processes.

According to an embodiment, one or more of the abrasive particles 104 can be subjected to laser cutting. For example, an abrasive particle 104 before laser cutting is applied may have an initial shape comprised of a base with four or more side surfaces intersecting at an apex, similar to a pyramid. The abrasive particle 104 then can be cut with a digital laser having power between about 0.9 watts and about 2 watts, e.g., 1.1 watts, and a laser spot diameter between about 2 μm and about 10 μm, e.g., 3 μm to 5 μm. The use of a digital laser with relatively lower power, higher accuracy and lower heating can provide a smooth cut boundary, would be less prone to damage the region in the abrasive particle 104 that is adjacent to the cut area, and provide better surface flatness. In this manner, residual stress in the abrasive particle 104 can be suitably controlled, and the abrasive particle 104 would be less prone to collapse and jamming after the grinding tool 100 is used over a period of time.

Figure 2:
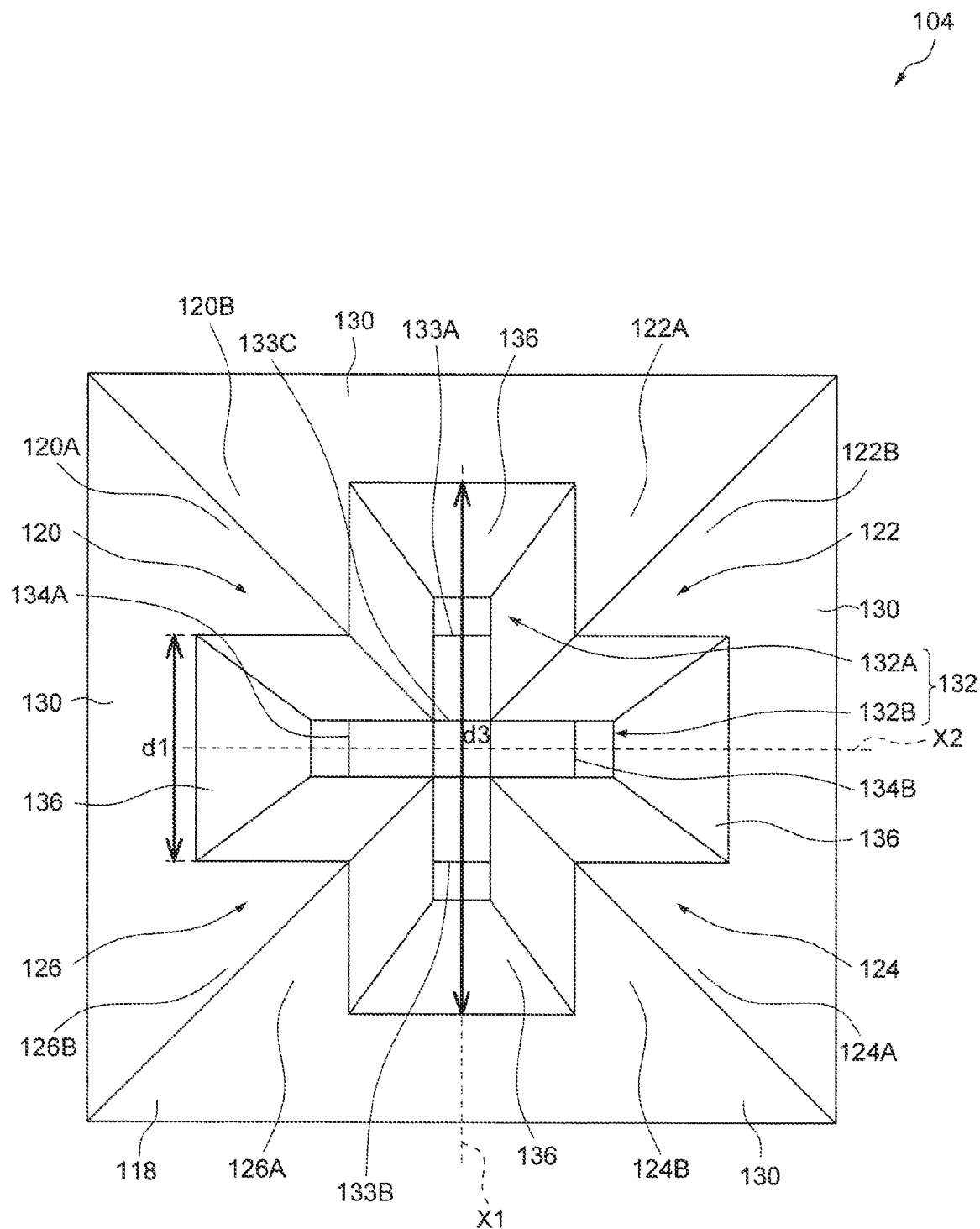
FIG. 2 is a schematic top view illustrating an embodiment of an abrasive particle used in the grinding tool.
Figure 3:
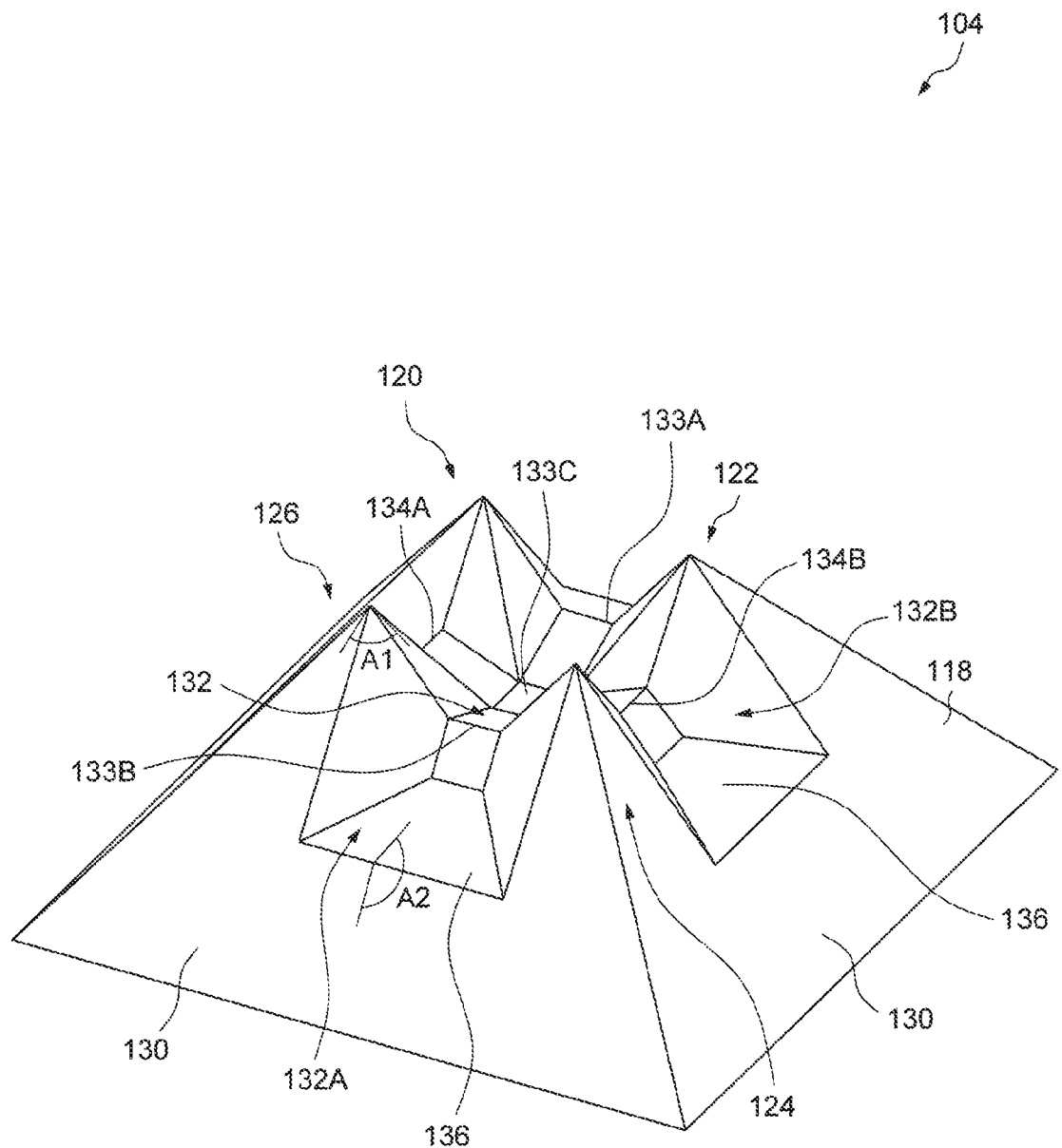
FIG. 3 is a perspective view of the abrasive particle shown in FIG. 2.

FIG. 2 is a schematic top view illustrating one abrasive particle 104, and FIG. 3 is a schematic perspective view of the abrasive particle 104 shown in FIG. 2. Referring to FIGS. 2 and 3, the abrasive particle 104 can be cut with a laser beam so as to form a structure including a base 118 and four tips 120, 122, 124 and 126. The base 118 can exemplary have four inclined side surfaces 130. The tips 120, 122, 124 and 126 can respectively protrude from the base 118. More specifically, the tips 120, 122, 124 and 126 can protrude respectively adjacent to four corners of the base 118, and can respectively form four vertexes of a square shape. According to an embodiment, any of the tips 120, 122, 124 and 126 can have a tip angle A1 defined as an inner material angle (i.e., within the material of the tip) between two opposite side surfaces of the tip that is between about 70 degrees and about 110 degrees, e.g., from 80 degrees to 100 degrees. This can provide desirable cutting efficiency.

According to an embodiment, each of the tips 120, 122, 124 and 126 can have two side surfaces that can respectively extend generally coplanar to two corresponding side surfaces 130 of the base 118. For example, two contiguous side surfaces 120A and 120B of the tip 120 can respectively extend generally coplanar to two side surfaces 130 of the base 118, two contiguous side surfaces 122A and 122B of the tip 122 can respectively extend generally coplanar to two side surfaces 130 of the base 118, two contiguous side surfaces 124A and 124B of the tip 124 can respectively extend generally coplanar to two side surfaces 130 of the base 118, and two contiguous side surfaces 126A and 126B of the tip 126 can respectively extend generally coplanar to two side surfaces 130 of the base 118. It will be appreciated, however, that other embodiments may have a different structure in which each of the tips 120, 122, 124 and 126 has no side surfaces coplanar to the side surfaces 130 of the base 118.

A cavity 132 can be formed in the base 118 of the abrasive particle 104, and can extend between the tips 120, 122, 124 and 126. According to an embodiment, the cavity 132 can be delimited at least partially by moderate slopes rather than steep V-shaped slopes, whereby the occurrence of residue jams in the cavity 132 may be reduced when the grinding tool 100 is used for conditioning a polishing pad.

According to an example of implementation, the cavity 132 can have a cross shape. More specifically, the cavity 132 can include two cavity portions 132A and 132B of generally elongate shapes that intersect each other and extend along two axes generally perpendicular to each other. A vertical cross-section of the cavity portion 132A can include a generally M-shaped profile having two ridges 133A and 133B and a depression 133C between the two ridges 133A and 133B. The depression 133C is sunken relative to the two ridges 133A and 133B, and the ridges 133A and 133B and the depression 133C are all lower than the height of the tips 120, 122, 124 and 126. Likewise, a vertical cross-section of the cavity portion 132B can include a generally M-shaped profile having two ridges 134A and 134B and the depression 133C between the two ridges 134A and 134B. The depression 133C is sunken relative to the two ridges 134A and 134B, and the ridges 134A and 134B and the depression 133C are all lower than the height of the tips 120, 122, 124 and 126.

The cavity 132 can further include a plurality of material discharge surfaces 136 defined between pairs of adjacent tips among the tips 120, 122, 124 and 126. For example, one material discharge surface 136 can be formed between the two adjacent tips 120 and 122, one material discharge surface 136 can be formed between the two adjacent tips 122 and 124, one material discharge surface 136 can be formed between the two adjacent tips 124 and 126, and one material discharge surface 136 can be formed between the two adjacent tips 120 and 126. According to an embodiment, the the abrasive particle 104 is cut with a laser beam to have four tips 120, 122, 124 and 126 and four material discharge surfaces 136, wherein two material discharge surfaces 136 are respectively located at two opposite ends of the cavity portion 132A, the two other material discharge surfaces 136 are respectively located at two opposite ends of the cavity portion 132B, and the four material discharge surfaces 136 are respectively connected with the side surfaces 130 of the base 118 adjacent thereto.

Referring to FIG. 3, an inner material angle A2 (i.e., at the material side) can be respectively defined between each material discharge surface 136 and the side surface 130 of the base 118 adjacent thereto. According to an embodiment, each inner material angle A2 can be between about 120 degrees and about 160 degrees, e.g., from 130 degrees to 150 degrees.

Referring to FIGS. 2 and 3, each material discharge surface 136 and the side surface 130 adjacent thereto can be connected with each other along a boundary edge having a length d1. According to an embodiment, each length d1 can be between about 80 µm and about 180 µm, e.g., from 95 µm to 165 µm.

Figure 4:
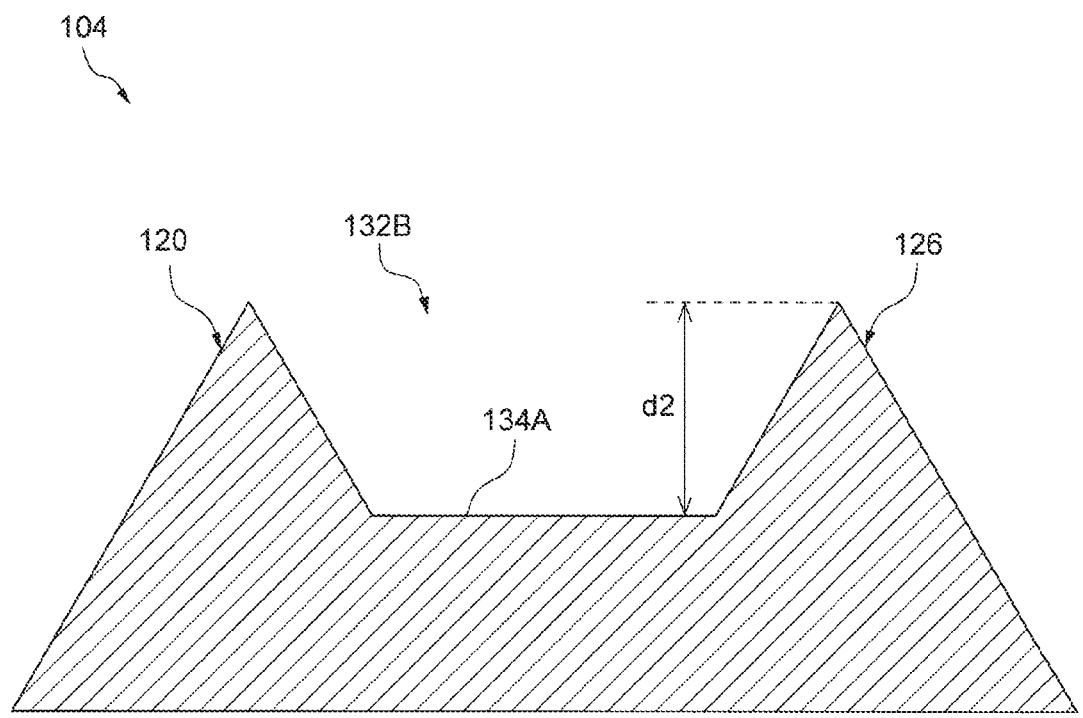
FIG. 4 is a schematic cross-sectional view illustrating a region between two adjacent tips cut in the abrasive particle.

Referring to FIGS. 3 and 4, each region of the cavity 132 between a pair of adjacent tips 120, 122, 124 and 126 can have a greatest height variation d2 taken along an orthogonal direction relative to the cavity 132. In the cross-sectional view of FIG. 4, a greatest height variation d2 in the region of the cavity 132 between the two adjacent tips 120 and 126 is exemplary shown as being an orthogonal distance between the ridge 134A of the cavity portion 132B and a top of the highest one among the two adjacent tips 120 and 126. Likewise, a greatest height variation d2 in the region of the cavity 132 between the two adjacent tips 122 and 124 is an orthogonal distance between the ridge 134B of the cavity portion 132B and a top of the highest one among the two adjacent tips 122 and 124; a greatest height variation d2 in the region of the cavity 132 between the two adjacent tips 120 and 122 is an orthogonal distance between the ridge 133A of the cavity portion 132A and a top of the highest one among the two adjacent tips 120 and 122; and a greatest height variation d2 in the region of the cavity 132 between the two adjacent tips 124 and 126 is an orthogonal distance between the ridge 133B of the cavity portion 132A and a top of the highest one among the two adjacent tips 124 and 126. According to an embodiment, each greatest height variation d2 can be between about 40 µm and about 120 µm, e.g., from 50 µm to 110 µm.

Referring to FIG. 2, the cavity portion 132A can have a length d3, which is defined as a distance separating the two boundary edges between the two opposite material discharge surfaces 136 of the cavity portion 132A and the two side surfaces 130 of the base 118 respectively adjacent thereto. Likewise, the cavity portion 132B can have a length d3 defined as a distance separating the two boundary edges between the two opposite material discharge surfaces 136 of the cavity portion 132B and the two side surfaces 130 of the base 118 respectively adjacent thereto. According to an embodiment, each of the cavity portions 132A and 132B can have a length d3 between about 275 µm and about 375 µm, e.g. from 295 µm to 355 µm. According to an embodiment, the cavity portions 132A and 132B can have a substantially equal length d3.

According to an embodiment of the abrasive particle 104, the tip angle A1 can be between 89.230 degrees and 91.037 degrees, the inner material angle A2 is equal to about 132.803, the length d1 is equal to about 175.255 µm, the greatest height variation d2 is equal to about 63.209 µm, and the length d3 is equal to about 326.864 µm.

Figure 5:
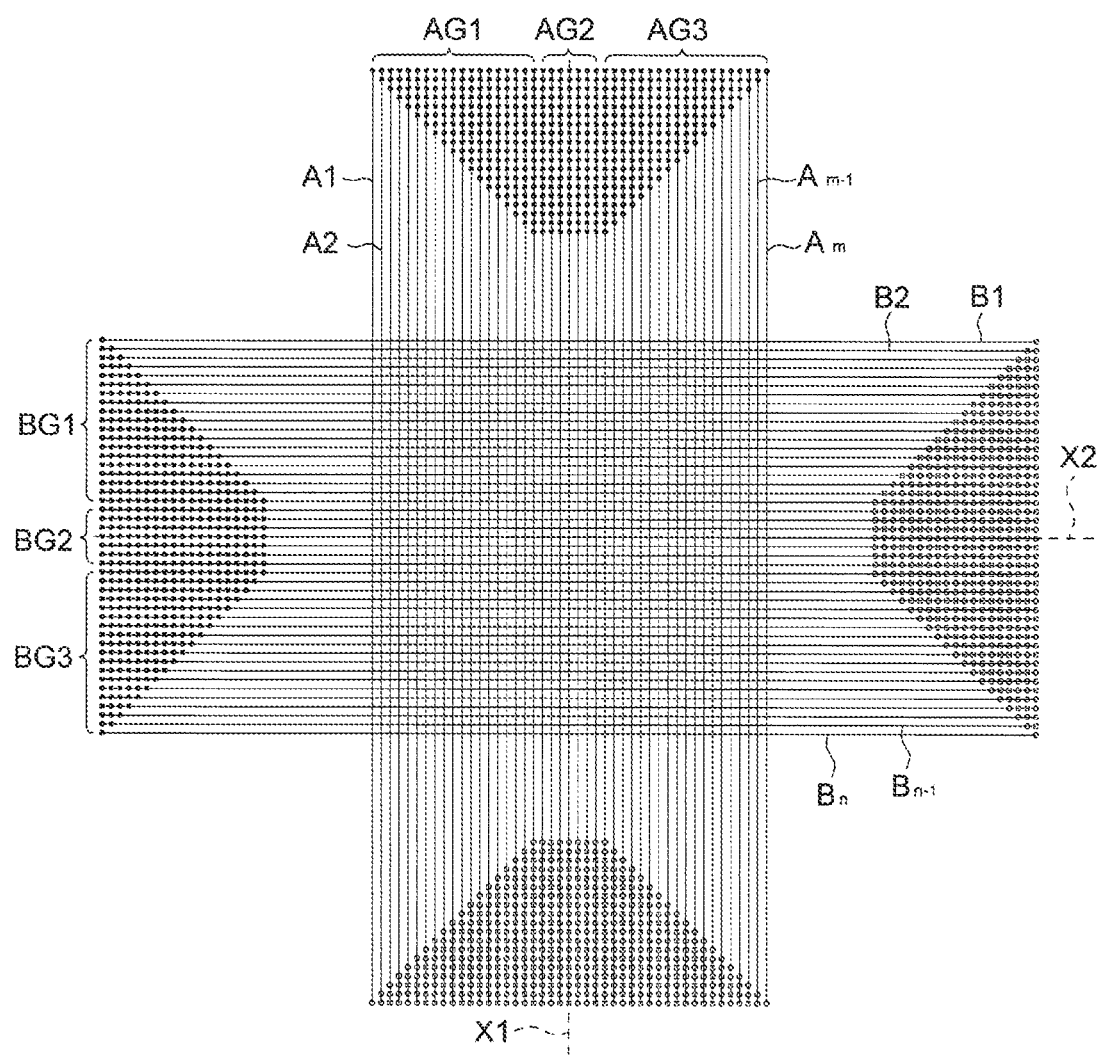
FIG. 5 is a schematic view illustrating an embodiment of a laser machining method applicable for cutting an abrasive particle.

In conjunction with FIGS. 2 and 3, FIG. 5 is a schematic view illustrating an embodiment of a laser machining method applicable for cutting the abrasive particle 104 described previously. The laser machining method can define a plurality of straight first cutting lines $A_1, A_2, \ldots A_m$, parallel to one another along a first direction, and a plurality of straight second cutting lines $B_1, B_2, \ldots B_n$ parallel to one another along a second direction, m being the number of first cutting lines along the first direction, n being the number of second cutting lines along the second direction, and the cutting second lines $B_1, B_2, \ldots B_n$ intersecting perpendicularly the first cutting lines $A_1, A_2, \ldots A_m$. A laser beam can cut an abrasive particle in a tip region thereof along the first cutting lines $A_1, A_2, \ldots A_m$, and the second cutting lines $B_1, B_2, \ldots B_n$ to form the structure of the cavity 132 in the abrasive particle 104 described previously. For example, the first cutting lines $A_1, A_2, \ldots A_m$ can extend along a longitudinal axis of the cavity portion 132A, and can have a length substantially equal to the length d3 of the cavity portion 132A. The second cutting lines $B_1, B_2, \ldots B_n$ can extend along a longitudinal axis of the cavity portion 132B, and can have a length substantially equal to the length of the cavity portion 132B. The first cutting lines $A_1, A_2, \ldots A_m$ can be grouped into two outer regions AG1 and AG3, and a middle region AG2 between the two outer regions AG1 and AG3 that extends past a tip region of the initial abrasive particle. Likewise, the second cutting lines $B_1, B_2, \ldots B_n$ can be grouped into two outer regions BG1 and BG3, and a middle region BG2 between the two outer regions BG1 and BG3, the middle regions BG2 and AG2 being perpendicular to each other and extending past the same tip region of the initial abrasive particle subjected to laser cutting. A laser beam can apply one or more cutting passes along each cutting line. In FIG. 5, each solid dot on a first or second cutting line indicates a start point of a cutting pass applied by the laser beam along that cutting line, and each hollow dot on a first or second cutting line indicates an endpoint of a cutting pass applied by the laser beam along that cutting line.

A laser beam can perform different numbers of cutting passes along different cutting lines for forming the abrasive particle 104. According to at least an embodiment, the number of cutting passes repeated along each first cutting line in each of the two outer regions AG1 and AG3 can increase as the first cutting line is nearer to the middle region AG2. Moreover, multiple cutting passes applied along a same first cutting line in any of the two outer regions AG1 and AG3 can vary in length but have a same center corresponding to a center of the first cutting line. In particular, the respective centers of the cutting passes along the first cutting lines in the outer regions AG1 and AG3 can be located adjacent to a central axis X2 of the cavity portion 132B. For example, a predetermined number of cutting passes can be repeated along a given first cutting line according to a method in which a start point of a next cutting pass can be displaced a distance from the start point of its preceding cutting pass toward the center of the first cutting line, and an endpoint of the next cutting pass can be displaced a distance from the endpoint of its preceding cutting pass toward the center of the first cutting line, the start point and the endpoint of each cutting pass being symmetric to each other relative to the center of the first cutting line. All cutting passes along a same first cutting line can thereby have a same center located adjacent to the central axis X2 of the cavity portion 132B.

FIG. 5 illustrates an example in accordance with the aforementioned laser cutting method. Referring to FIG. 5, a single cutting pass is exemplary performed along the outermost first cutting line $A_1$ in the outer region AG1, and two cutting passes are exemplary performed along the next inward first cutting line $A_2$ in the outer region AG1. The second cutting pass can be shorter than the first cutting pass along the first cutting line $A_2$, and both cutting passes can be concentric. The number of cutting passes can be exemplary incremented by one at each next inward first cutting line in the outer region AG1. Likewise, a single cutting pass is exemplary performed along the outermost first cutting line $A_m$ in the outer region AG3, and two cutting passes are exemplary performed along the next inward first cutting line $A_{m-1}$ in the outer region AG3. The second cutting pass can be shorter than the first cutting pass along the first cutting line $A_{m-1}$, and both cutting passes can be concentric. The number of cutting passes can be exemplary incremented by one at each next inward first cutting line in the outer region AG3. It will be understood that the example of FIG. 5 is provided for illustration only, the number of cutting passes per first cutting line and the increment in the number of cutting passes across the first cutting lines may differ from the illustrated example.

Referring again to FIG. 5, a same number of cutting passes is applied along each first cutting line in the middle region AG2. Moreover, the number of cutting passes can be repeated along each first cutting line in the middle region AG2 according to a method in which a start point of a next cutting pass can be displaced a distance from the start point of its preceding cutting pass toward the center of the first cutting line, and an endpoint of the next cutting pass can be displaced a distance from the endpoint of its preceding cutting pass toward the center of the first cutting line, the start point and the endpoint of each cutting pass being symmetric to each other relative to the center of the first cutting line. All cutting passes along a same first cutting line in the middle region AG2 can thereby have different lengths but a same center corresponding to a center of the first cutting line. The centers of all cutting passes along each first cutting line in the middle region AG2 can be located adjacent to the central axis X2 of the cavity portion 132B.

According to at least an embodiment, a greatest number of cutting passes along a same first cutting line in any of the outer regions AG1 and AG3 is performed along the first cutting line that is adjacent to the middle region AG2, and is not greater than (i.e., it can only be smaller or equal to) the number of cutting passes along each first cutting line in the middle region AG2. According to at least an embodiment, the number of first cutting lines in the middle region AG2 is smaller than the number of first cutting lines in each of the two outer regions AG1 and AG3. According to an embodiment, the two outer regions AG1 and AG3 can be symmetrically configured, i.e., the number of first cutting lines is the same in the two outer regions AG1 and AG3, and the cutting passes (including the number of cutting passes, the start points and the endpoints thereof) can be symmetrically configured along the first cutting lines in the two outer regions AG1 and AG3 relative to a central axis X1 of the cavity portion 132A.

Referring to FIG. 5, the cutting passes can be configured symmetrically relative to the central axis X1 of the cavity portion 132A in the two outer regions AG1 and AG3 and the middle region AG2, and can be performed according to any suitable cutting sequences and directions. According to an embodiment, a laser cutting sequence can exemplary include performing a first cutting pass sequentially from the left side to the right side of FIG. 5 along all the first cutting lines $A_1$, $A_2$, ... $A_m$. Then a second cutting pass can be performed sequentially from the left side to the right side of FIG. 5 along the first cutting lines $A_2$, ... $A_{m-1}$ that require two or more cutting passes. A third cutting pass, a fourth cutting pass and so on can be likewise applied, until all the requisite cutting passes in the regions AG1, AG2 and AG3 are completed. Of course, it will be understood that other laser cutting sequences may be applied as desired. For example, a variant laser cutting sequence can be applied sequentially from the right side to the left side of FIG. 5 along the first cutting lines $A_m, A_{m-1}, \ldots A_1$.

The cutting passes along the second cutting lines $B_1$, $B_2$, ... $B_n$ may be configured similar to the cutting passes along the first cutting lines $A_1, A_2, \ldots A_m$. Referring to FIG. 5, according to at least an embodiment, the number of cutting passes repeated along each second cutting line in each of the two outer regions BG1 and BG3 can increase as the second cutting line is nearer to the middle region BG2. Moreover, multiple cutting passes applied along a same second cutting line in any of the two outer regions BG1 and BG3 can vary in length but have a same center corresponding to a center of the second cutting line. In particular, the respective centers of the cutting passes along the second cutting lines in the outer regions BG1 and BG3 can be located adjacent to the central axis X1 of the cavity portion 132A. For example, a predetermined number of cutting passes can be repeated along a given second cutting line according to a method in which a start point of a next cutting pass can be displaced a distance from the start point of its preceding cutting pass toward the center of the second cutting line, and an endpoint of the next cutting pass can be displaced a distance from the endpoint of its preceding cutting pass toward the center of the second cutting line, the start point and the endpoint of each cutting pass being symmetric to each other relative to the center of the second cutting line. All cutting passes along a same second cutting line can thereby have a same center located adjacent to the central axis X1 of the cavity portion 132A.

Referring to the example illustrated in FIG. 5, a single cutting pass is exemplary performed along the outermost second cutting line $B_1$ in the outer region BG1, and two cutting passes are exemplary performed along the next inward second cutting line $B_2$ in the outer region BG1. The second cutting pass can be shorter than the first cutting pass along the second cutting line $B_2$, and both cutting passes can be concentric. The number of cutting passes can be exemplary incremented by one at each next inward second cutting line in the outer region BG1. Likewise, a single cutting pass is exemplary performed along the outermost second cutting line $B_n$ in the outer region BG3, and two cutting passes are exemplary performed along the next inward second cutting line $B_{n-1}$ in the outer region BG3. The second cutting pass can be shorter than the first cutting pass along the second cutting line $B_{n-1}$, and both cutting passes can be concentric. The number of cutting passes can be exemplary incremented by one at each next inward second cutting line in the outer region BG3. It will be understood that the example of FIG. 5 is provided for illustration only, the number of cutting passes per second cutting line and the increment in the number of cutting passes across the second cutting lines may differ from the illustrated example.

Referring again to FIG. 5, a same number of cutting passes is applied along each second cutting line in the middle region BG2. Moreover, the number of cutting passes can be repeated along each second cutting line in the middle region BG2 according to a method in which a start point of a next cutting pass can be displaced a distance from the start point of its preceding cutting pass toward the center of the second cutting line, and an endpoint of the next cutting pass can be displaced a distance from the endpoint of its preceding cutting pass toward the center of the second cutting line, the start point and the endpoint of each cutting pass being symmetric to each other relative to the center of the second cutting line. All cutting passes along a same second cutting line in the middle region BG2 can thereby have different lengths but a same center corresponding to a center of the second cutting line. The centers of all cutting passes along each second cutting line in the middle region BG2 can be located adjacent to the central axis X1 of the cavity portion 132A.

According to at least an embodiment, a greatest number of cutting passes along a same second cutting line in any of the outer regions BG1 and BG3 is performed along the second cutting line that is adjacent to the middle region BG2, and is not greater than (i.e., it can only be smaller or equal to) the number of cutting passes along each second cutting line in the middle region BG2. According to at least an embodiment, the number of second cutting lines in the middle region BG2 is smaller than the number of second cutting lines in each of the two outer regions BG1 and BG3. According to at least an embodiment, the two outer regions BG1 and BG3 can be symmetrically configured, i.e., the number of second cutting lines is the same in the two outer regions BG1 and BG3, and the cutting passes (including the number of cutting passes, the start points and the endpoints thereof) can be symmetrically configured along the second cutting lines in the two outer regions BG1 and BG3 relative to the central axis X2 of the cavity portion 132B.

Referring to FIG. 5, the cutting passes can be configured symmetrically relative to the central axis X2 of the cavity portion 132B in the two outer regions BG1 and BG3 and the middle region BG2, and can be performed according to any suitable cutting sequences and directions. According to an embodiment, a laser cutting sequence can exemplary include performing a first cutting pass sequentially from an upper side to a lower side of FIG. 5 along all the second cutting lines $B_1, B_2, \ldots B_n$. Then a second cutting pass can be performed sequentially from the upper side to the lower side of FIG. 5 along the second cutting lines $B_2, \ldots B_{n-1}$ that require two or more cutting passes. A third cutting pass, a fourth cutting pass and so on can be likewise applied, until all the requisite cutting passes in the regions BG1, BG2 and BG3 are completed. Of course, it will be understood that other laser cutting sequences may be applied as desired. For example, a variant laser cutting sequence can be applied sequentially from the lower side to the upper side of FIG. 5 along the second cutting lines $B_n, B_{n-1}, \ldots B_1$.

According to an embodiment, the laser cutting method implemented in the regions AG1, AG2 and AG3 is similar to that implemented in the regions BG1, BG2 and BG3, which may include a same number of cutting lines and a similar configuration of cutting passes in the outer regions AG1, AG3, BG1 and BG3, and a same number of cutting lines and a similar configuration of cutting passes in the middle regions AG2 and BG2. Moreover, the distance that separates the start points of any two successive cutting passes can be substantially equal to the distance that separates the endpoints of any two successive cutting passes, as exemplary illustrated in FIG. 5.

In the example of FIG. 5, each of the outer regions AG1 and AG3 respectively includes 19 first cutting lines, the middle region AG2 includes 9 first cutting lines, each of the outer regions BG1 and BG3 respectively includes 19 second cutting lines, and the middle region BG2 includes 9 second cutting lines. It will be understood, however, that the number of cutting lines and the configuration of the cutting passes along the cutting lines may be modified to obtain a different shape of the cavity between the tips 120, 122, 124 and 126.

Figure 6:
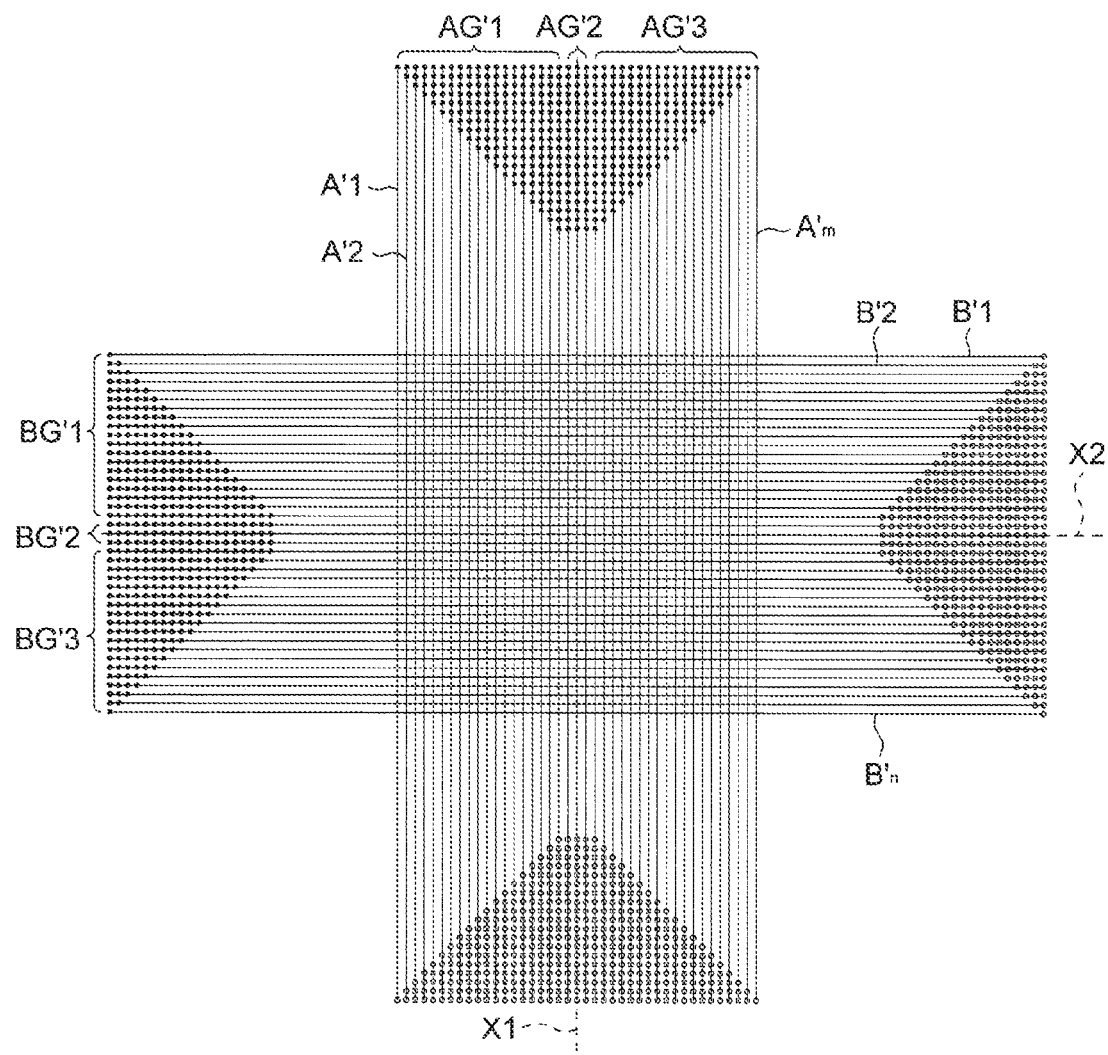
FIG. 6 is a schematic view illustrating another embodiment of a laser machining method applicable for cutting an abrasive particle.

FIG. 6 is a schematic view illustrating another embodiment of a laser machining method for cutting a desirable abrasive particle. In the embodiment shown in FIG. 6, the first cutting lines $A'_1, A'_2 \ldots A'_m$ along the first direction can be grouped into two outer regions AG'1 and AG'3 and a middle region AG'2 between the two outer regions AG'1 and AG'3, and the second cutting lines $B'_1, B'_2 \ldots B'_n$ along the second direction can be grouped into two outer regions BG'1 and BG'3 and a middle region BG'2 between the two outer regions BG'1 and BG'3. Each of the outer regions AG'1 and AG'3 may respectively include 15 first cutting lines, the middle region AG'2 may include 3 first cutting lines, each of the outer regions BG'1 and BG'3 may respectively include 15 second cutting lines, and the middle region BG'2 may include 3 second cutting lines. The laser cutting method implemented in the regions AG'1, AG'2 and AG'3 may be similar to that implemented in the regions BG'1, BG'2 and BG'3, which may include a same number of cutting lines and a similar configuration of cutting passes in the outer regions AG'1, AG'3, BG'1 and BG'3, and a same number of cutting lines and a similar configuration of cutting passes in the middle regions AG'2 and BG'2.

Figure 7:
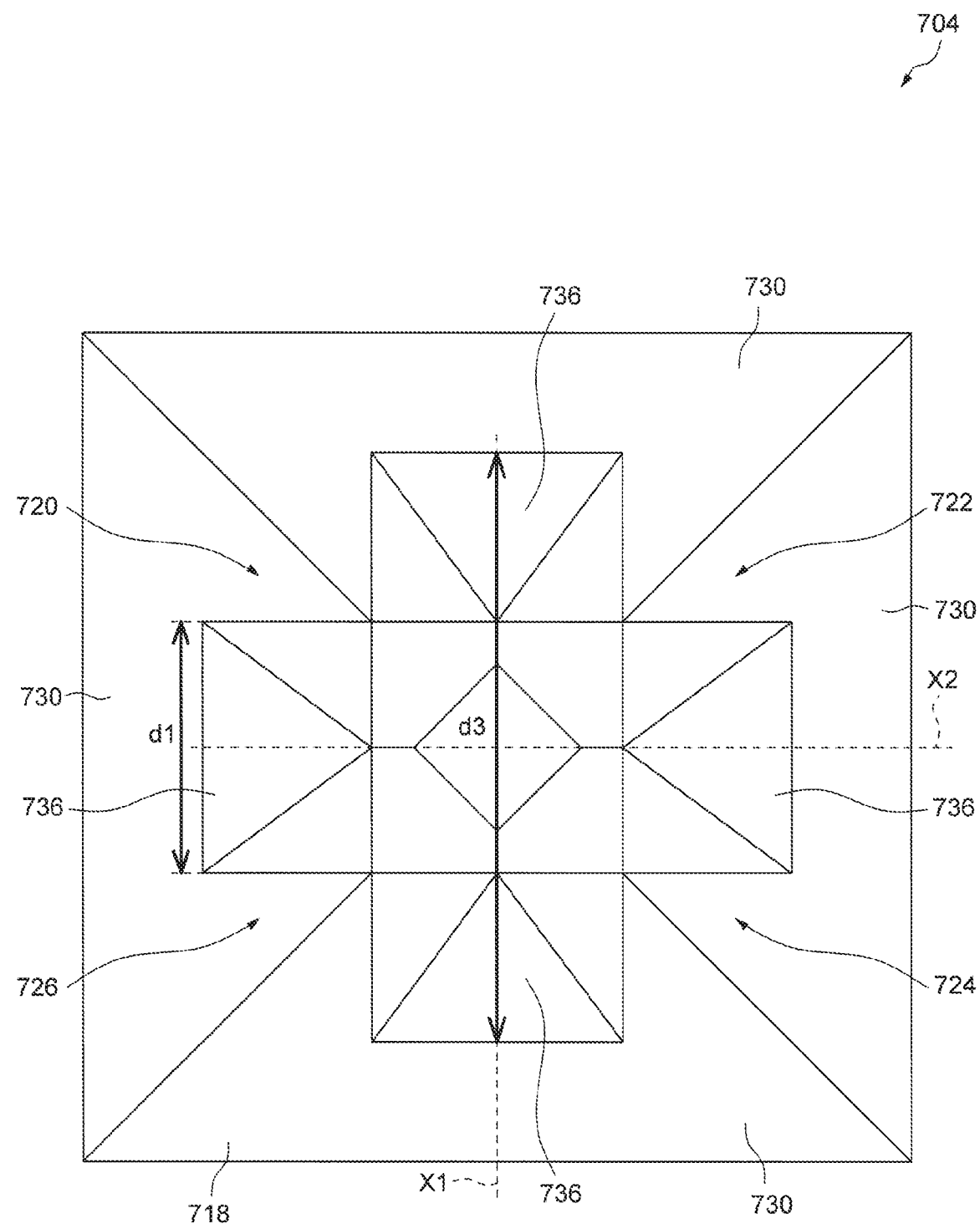
FIG. 7 is a schematic top view illustrating another embodiment of an abrasive particle that can be used in a grinding tool.
Figure 8:
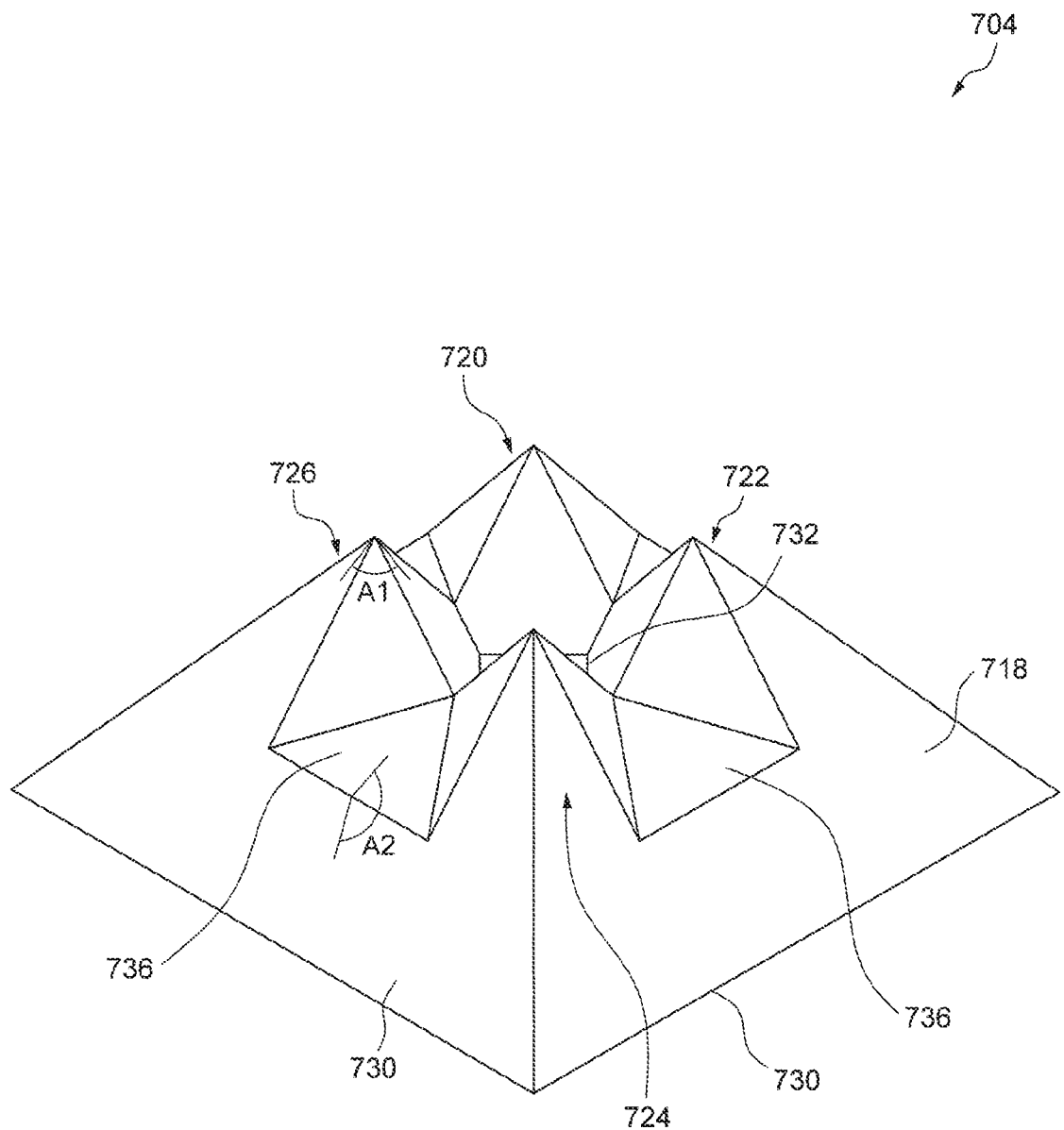
FIG. 8 is a schematic perspective view of the abrasive particle shown in FIG. 7.
Figure 9:
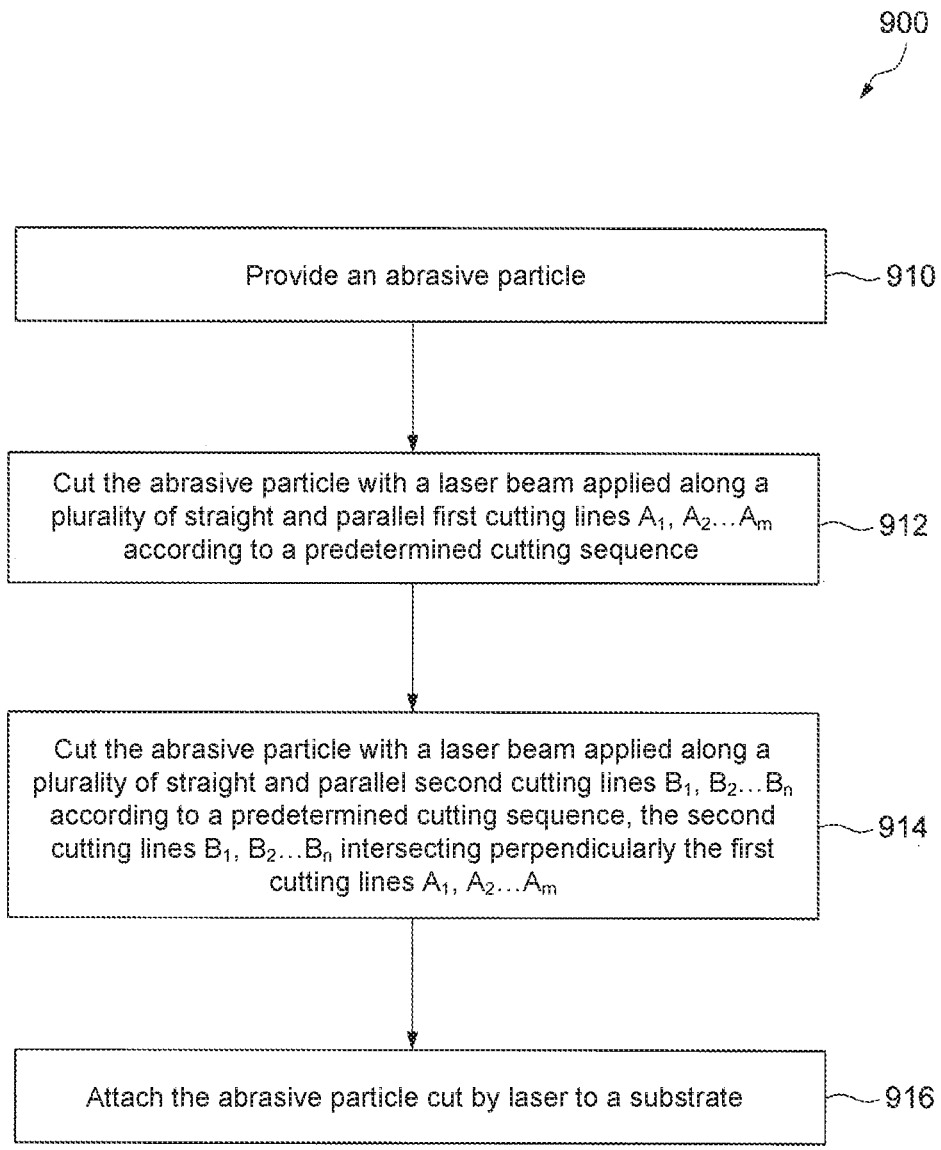
FIG. 9 is a flowchart of processing steps in a method for fabricating a grinding tool.

FIG. 7 is a schematic top view illustrating another embodiment of an abrasive particle 704 cut with a laser beam, and FIG. 8 is a perspective view illustrating a cut portion of the abrasive particle 704. Referring to FIGS. 7 and 8, the abrasive particle 704 can include a base 718, and four tips 720, 722, 724 and 726 protruding from the base 718. Any of the tips 720, 722, 724 and 726 can have a tip angle A1 defined as an inner material angle (i.e., within the material of the tip) between two opposite side surfaces of the tip that is between about 70 degrees and about 110 degrees.

Moreover, a cavity 732 having a generally cross-shape can be formed in the base 718 of the abrasive particle 704 between the tips 720, 722, 724 and 726. According to an embodiment, the cavity 732 can be delimited at least partially by moderate slopes, whereby the occurrence of residue jams in the cavity 732 may be reduced. The cavity 732 can include a plurality of material discharge surfaces 736 defined between pairs of adjacent tips among the tips 720, 722, 724 and 726. For example, one material discharge surface 736 can be formed between the two adjacent tips 720 and 722, one material discharge surface 736 can be formed between the two adjacent tips 722 and 724, one material discharge surface 736 can be formed between the two adjacent tips 724 and 726, and one material discharge surface 736 can be formed between the two adjacent tips 720 and 726. An inner material angle A2 (i.e., at the material side) can be respectively defined between each material discharge surface 736 and a side surface 730 of the base 718 adjacent thereto. According to an embodiment, each inner material angle A2 can be between about 120 degrees and about 160 degrees, e.g., from 130 degrees to 150 degrees. According to an embodiment, the tip angle A1 can be 141.603 degrees, and the inner material angle A2 is from 91.153 degrees to 93.670 degrees.

In conjunction with FIGS. 1-5, FIG. 9 is a flowchart of processing steps in a method 900 for fabricating a grinding tool. In initial step 910, an abrasive particle is provided. The abrasive particle may be affixed to a substrate of a grinding tool to fabricate, or to a carrying body of a laser cutting equipment. The abrasive particle may exemplary have the crystal form of a hexoctahedron. The abrasive particle may be made of any material of high hardness, which may include diamond, cubic boron nitride, aluminum oxide, and silicon carbide.

In step 912, a laser beam is applied to cut a tip region of the abrasive particle along the first cutting lines $A_1, A_2, \ldots A_m$. The first cutting lines $A_1, A_2, \ldots A_m$ are straight cutting lines that can exemplary extend parallel to the axis of the cavity portion 132A shown in FIG. 2. As described previously, the first cutting lines $A_1, A_2, \ldots A_m$ can be grouped into two outer regions AG1 and AG3, and a middle region AG2 between the two outer regions AG1 and AG3 that extends past a tip region of the abrasive particle to be cut with a laser beam. The laser beam can be controlled to perform one or more cutting pass along the first cutting lines $A_1, A_2, \ldots A_m$ according to the following cutting method. The number of cutting passes repeated along each first cutting line in each of the two outer regions AG1 and AG3 can increase as the first cutting line is nearer to the middle region AG2, and multiple cutting passes applied along a same first cutting line can vary in length but have a same center. With respect to the middle region AG2, a same number of cutting passes is applied along each first cutting line in the middle region AG2. The number of cutting passes can be repeated along each first cutting line in the middle region AG2 according to a method in which a start point of a next cutting pass can be displaced a distance from the start point of its preceding cutting pass toward the center of the first cutting line, and an endpoint of the next cutting pass can be displaced a distance from the endpoint of its preceding cutting pass toward the center of the first cutting line, whereby all cutting passes along a same first cutting line in the middle region AG2 can have different lengths but a same center.

In each of the outer regions AG1 and AG3, the first cutting line that is adjacent to the middle region AG2 has the greatest number of cutting passes, which is not greater than (i.e., it can only be smaller or equal to) the number of cutting passes along each first cutting line in the middle region AG2. Moreover, the number of first cutting lines in the middle region AG2 is smaller than the number of first cutting lines in each of the two outer regions AG1 and AG3. In addition, the two outer regions AG1 and AG3 can be configured symmetrically, i.e., the number of first cutting lines is the same in the two outer regions AG1 and AG3, and the cutting passes (including the number of cutting passes, the start points and the endpoints thereof) can be symmetrically configured along the first cutting lines in the two outer regions AG1 and AG3. According to an embodiment, the cutting passes in the regions AG1, AG2 and AG3 can be configured symmetrically relative to the central axis X1 of the cavity portion 132A.

In accordance with the aforementioned cutting method, step 912 can include applying a cutting sequence comprising performing a first cutting pass sequentially along all the first cutting lines $A_1, A_2, \ldots A_m$, and then a second cutting pass can be performed sequentially along the first cutting lines $A_2, \ldots A_{m-1}$ that require at least two cutting passes. A third cutting pass, a fourth cutting pass and so on can be likewise applied, until all the requisite cutting passes are completed.

In step 914, the laser beam is applied to cut the tip region of the abrasive particle along the second cutting lines $B_1$, $B_2, \ldots B_n$. The second cutting lines $B_1, B_2, \ldots B_n$ are straight cutting lines perpendicular to the first cutting lines $A_1, A_2, \ldots A_m$, and can exemplary extend parallel to the axis of the cavity portion 132B shown in FIG. 2. As described previously, the second cutting lines $B_1, B_2, \ldots B_n$ can be grouped into two outer regions BG1 and BG3, and a middle region BG2 between the two outer regions BG1 and BG3 that extends past the tip region of the abrasive particle to be cut. The laser beam can be controlled to perform one or more cutting pass along the second cutting lines $B_1, B_2, \ldots B_n$ according to the following cutting method. The number of cutting passes repeated along each second cutting line in each of the two outer regions BG1 and BG3 can increase as the second cutting line is nearer to the middle region BG2, and multiple cutting passes applied along a same second cutting line can vary in length but have a same center. With respect to the middle region BG2, a same number of cutting passes is applied along each second cutting line in the middle region BG2. The number of cutting passes can be repeated along each second cutting line in the middle region BG2 according to a method in which a start point of a next cutting pass can be displaced a distance from the start point of its preceding cutting pass toward the center of the second cutting line, and an endpoint of the next cutting pass can be displaced a distance from the endpoint of its preceding cutting pass toward the center of the second cutting line, whereby all cutting passes along a same second cutting line in the middle region BG2 can have different lengths but a same center.

In each of the outer regions BG1 and BG3, the second cutting line that is adjacent to the middle region BG2 has the greatest number of cutting passes, which is not greater than (i.e., it can only be smaller or equal to) the number of cutting passes along each second cutting line in the middle region BG2. Moreover, the number of second cutting lines in the middle region BG2 is smaller than the number of second cutting lines in each of the two outer regions BG1 and BG3. In addition, the two outer regions BG1 and BG3 can be configured symmetrically, i.e., the number of second cutting lines is the same in the two outer regions BG1 and BG3, and the cutting passes (including the number of cutting passes, the start points and the endpoints thereof) can be symmetrically configured along the second cutting lines in the two outer regions BG1 and BG3. According to an embodiment, the cutting passes in the regions BG1, BG2 and BG3 can be configured symmetrically relative to the central axis X2 of the cavity portion 132B.

In accordance with the aforementioned cutting method, step 914 can include applying a cutting sequence comprising performing a first cutting pass sequentially along all the second cutting lines $B_1, B_2, \ldots B_n$, and then a second cutting pass can be performed sequentially along the second cutting lines $B_2, \ldots B_{n-1}$ that require at least two cutting passes. A third cutting pass, a fourth cutting pass and so on can be likewise applied, until all the requisite cutting passes are completed.

Once steps 912 and 914 are completed, the obtained abrasive particle can have four tips protruding from the base thereof, and a material discharge surface can be defined between each pair of adjacent tips, as shown in FIGS. 2-4 or FIGS. 7 and 8.

According to an embodiment, the abrasive particle provided in step 910 may be affixed to a carrying body of a laser cutting equipment. After steps 912 and 914 are completed, step 916 is performed to affix the cut abrasive particle to a substrate of a grinding tool. For example, as shown in FIG. 1, the abrasive particle 104 can be attached to the post 110, and the post 110 can be attached into the hole 112 of the substrate 102 with a bonding layer.

The grinding tool described herein can include abrasive particles cut to have smooth surfaces, which can better control residual stress in the abrasive particles and provide better surface flatness and better edge definition. The abrasive particles of the grinding tool thus would be less prone to jamming or crumbling in use.

Realizations of the grinding tool and its fabrication process have been described in the context of particular embodiments. These embodiments are meant to be illustrative and not limiting. Many variations, modifications, additions, and improvements are possible. These and other variations, modifications, additions, and improvements may fall within the scope of the inventions as defined in the claims that follow.

What is claimed is:

1. A grinding tool comprising:
    a substrate; and
    at least one abrasive particle affixed to the substrate, wherein the abrasive particle has a base, and four tips adjacent to one another protruding from the base, the base having a cavity of a generally cross shape extending between the four tips, the cavity including a material discharge surface disposed between two adjacent ones of the four tips, the material discharge surface being located at an end of the cavity and adjacent to a side surface of the base, an inner material angle between the material discharge surface and the side surface being between about 120 degrees and about 160 degrees, and a region of the cavity between two adjacent ones of the four tips having a ridge, the abrasive particle having a greatest height variation taken from the ridge that is between about 40 μm and about 120 μm.

2. The grinding tool according to claim 1, wherein the inner material angle is limited between 130 degrees and 150 degrees.

3. The grinding tool according to claim 1, wherein the material discharge surface and the side surface of the base adjacent thereto are connected with each other along a boundary edge having a length between about 80 μm and about 180 μm.

4. The grinding tool according to claim 1, wherein the cavity includes two cavity portions extending perpendicular to each other, at least one of the two cavity portions having a length between about 275 μm and about 375 μm.

5. The grinding tool according to claim 1, wherein at least one of the four tips has a tip angle between about 70 degrees and about 110 degrees.

6. The grinding tool according to claim 1, wherein the abrasive particle includes diamond, cubic boron nitride, aluminum oxide and silicon carbide.

7. The grinding tool according to claim 1, further including a post attached into a hole provided in the substrate, and the abrasive particle is affixed to the substrate via the post.

8. A grinding tool comprising:
a substrate;
a post attached into a hole provided in the substrate; and
at least one abrasive particle affixed to the substrate via the post, wherein the abrasive particle has a base, and four tips adjacent to one another protruding from the base, the base having a cavity of a generally cross shape extending between the four tips, the cavity including a material discharge surface disposed between two adjacent ones of the four tips, the material discharge surface being located at an end of the cavity and adjacent to a side surface of the base, an inner material angle between the material discharge surface and the side surface being between about 120 degrees and about 160 degrees.

9. The grinding tool according to claim 8, wherein the inner material angle is limited between 130 degrees and 150 degrees.

10. The grinding tool according to claim 8, wherein the material discharge surface and the side surface of the base adjacent thereto are connected with each other along a boundary edge having a length between about 80 μm and about 180 μm.

11. The grinding tool according to claim 8, wherein a region of the cavity between two adjacent ones of the four tips has a ridge, and the abrasive particle has a greatest height variation taken from the ridge that is between about 40 μm and about 120 μm.

12. The grinding tool according to claim 8, wherein the cavity includes two cavity portions extending perpendicular to each other, at least one of the two cavity portions having a length between about 275 μm and about 375 μm.

13. The grinding tool according to claim 8, wherein at least one of the four tips has a tip angle between about 70 degrees and about 110 degrees.

14. The grinding tool according to claim 8, wherein the abrasive particle includes diamond, cubic boron nitride, aluminum oxide and silicon carbide.

* * * * *